(12) United States Patent
Cope et al.

(10) Patent No.: US 7,141,260 B2
(45) Date of Patent: Nov. 28, 2006

(54) APPARATUS AND METHOD FOR REMOVAL OF SEED PERICARP

(75) Inventors: Jason M. Cope, Johnston, IA (US); Wade Yang, Fayetteville, AR (US); Billy Davidson, Sapulpa, OK (US)

(73) Assignees: Pioneer Hi-Bred International, Inc., Johnston, IA (US); Board of Trustees of the University of Arkansas, Little Rock, AR (US)

( * ) Notice: Subject to any disclaimer, the term of this patent is extended or adjusted under 35 U.S.C. 154(b) by 454 days.

(21) Appl. No.: 10/230,688

(22) Filed: Aug. 29, 2002

(65) Prior Publication Data

US 2004/0043117 A1    Mar. 4, 2004

(51) Int. Cl.
*A23L 1/025* (2006.01)

(52) U.S. Cl. .............. 426/238; 426/629; 426/482; 426/483; 426/484; 426/507; 426/518; 99/567; 99/600; 99/601; 99/623

(58) Field of Classification Search ............. 426/238, 426/629, 478–479, 481–484, 507, 518; 99/567, 99/600–601, 623
See application file for complete search history.

(56) References Cited

U.S. PATENT DOCUMENTS

| | | | | |
|---|---|---|---|---|
| 4,181,534 A | | 1/1980 | Headley | |
| 4,753,159 A | * | 6/1988 | Eaton | 99/567 |
| 5,115,984 A | * | 5/1992 | Satake | 241/7 |
| 5,950,362 A | * | 9/1999 | Shors et al. | 47/61 |
| 6,165,525 A | * | 12/2000 | Rolle et al. | 426/238 |
| 6,185,865 B1 | * | 2/2001 | Soll et al. | 47/61 |
| 6,250,011 B1 | * | 6/2001 | Soll et al. | 47/57.6 |
| 6,254,764 B1 | * | 7/2001 | Babington et al. | 205/688 |
| 6,254,914 B1 | * | 7/2001 | Singh et al. | 426/482 |
| 6,416,802 B1 | * | 7/2002 | Lin et al. | 426/238 |
| 6,453,609 B1 | * | 9/2002 | Soll et al. | 47/57.6 |
| 6,592,921 B1 | * | 7/2003 | Taylor et al. | 426/312 |
| 6,709,690 B1 | * | 3/2004 | van Bommel | 426/482 |
| 6,899,910 B1 | * | 5/2005 | Johnston et al. | 426/482 |
| 6,936,294 B1 | * | 8/2005 | Matthews et al. | 426/483 |
| 2005/0118692 A1 | * | 6/2005 | Kinley et al. | 435/161 |
| 2005/0246786 A1 | * | 11/2005 | Adams et al. | 800/278 |

OTHER PUBLICATIONS

Measuring Devices for Agricultural Use, "Rice Polisher Pearlest", download of "www.kett.co.jp/e/products/pro5/parest.html" (2 pg.).

* cited by examiner

*Primary Examiner*—Drew Becker
(74) *Attorney, Agent, or Firm*—McKee, Voorhees & Sease, P.L.C.

(57) ABSTRACT

An apparatus and method for removing pericarp from a seed, such as a corn kernel. The method includes sonicating the kernel to loosen the pericarp and then separation of the pericarp. One example of separation is by frictional milling. An additional optional aspect of the invention is isolation of the pericarp from the remainder of the seed and/or further cleaning or purification of the pericarp.

53 Claims, 4 Drawing Sheets

APPARATUS AND METHOD FOR REMOVAL OF SEED PERICARP

BACKGROUND OF THE INVENTION

A. Field of the Invention

The present invention relates to the separation or isolation of the outer covering or pericarp tissue from the remainder of a seed.

B. Problems in the Art

A variety of circumstances requires the removal of the outer coating or pericarp of a seed. Most times, it is not a trivial task. The pericarp is usually a layer, several cells thick. Tissues or other adhering structure(s) connect the pericarp to the interior part of the seed. This, coupled with the relatively small size of most seeds, makes separation and removal of pericarp difficult, or at least time consuming and laborious.

Corn pericarp is an example. It is the mature ovarian female tissue of the seed. It protects the interior endosperm and embryo from disease and moisture loss. However, it has a special make-up; analogous to a fingernail. Tissues of the underlying endosperm adhere to the pericarp. Separation of the pericarp is not simply a matter of sorting.

Some of the reasons separation of pericarp from the remainder of the seed is desirable are as follows.

It is desirable to separate and discard corn pericarp from its endosperm in some food processing applications. The make up of pericarp detrimentally affects the nature and composition of the end product.

Pericarp removal is important as a preparatory step to perform biological tests to identify the genetic origin of corn germplasm. However, instead of removing it to discard it, in these instances it is desirable to isolate and retain the pericarp, but it should be free of any other seed tissue derived from the male and female, to obtain pure female DNA.

Still further, separation and isolation of corn pericarp is desirable in some cases to extract substances from the pericarp, for example, specific nucleic acids, proteins, vitamins, and other dietary or nutraceutical compounds. The pericarp can be rich in such substances.

Because of such needs, pericarp removal processes have been developed and used in the art. A conventional pericarp removal method in food processing applications involves soaking corn kernels in a chemical solution (e.g. sodium hydroxide (NaOH) and/or hydrogen peroxide ($H_2O_2$)) for a relatively long period of time (e.g. hours). Such chemical soaking has been found to substantially loosen pericarp such that an automated method of separation can be used to separate the loosened pericarp from the endosperm. These methods allow batches of a substantial number of kernels to be processed, and the process to be automated. However, such processes take a significant amount of time (e.g. hours of soaking) to get the pericarp sufficiently loosened. They also require the chemicals, and the costs and handling associated therewith. Additionally, the chemicals used tend to damage or otherwise effect the DNA in the pericarp.

Therefore, because damage to DNA must be avoided, when separating pericarp from the remainder of the kernel for genetic analysis, current conventional methodologies have stayed away from the chemical steeping. Instead, current methods involve trying to somewhat loosen the pericarp by soaking the kernels overnight in distilled water instead of chemicals. After such soaking, seed by seed, the pericarp is manually cut or picked off. Water soaking is not as effective as chemical baths at loosening the pericarp.

Although a relatively small number of seeds is needed for each batch to obtain enough pericarp material for genetic analysis (usually on the order of 10 to 100 or so), such seed-by-seed manual removal, with this number of seeds, can take one, two, or more person-hours. Furthermore, it is difficult, if not impossible, to completely remove all endosperm from the pericarp with these manual methods, contrary to the purity level needed or desired for accurate genetic testing results.

Therefore, there is a need for an improvement in the art relative to pericarp removal. A primary object, feature, or advantage of the present invention is the provision of a method and apparatus, which improves over the state of the art. Further objects, features and advantages of the present invention include an apparatus or method that:

1. allows effective pericarp removal, which is less labor intensive and time-consuming;
2. has applicability to either single or small amounts of seeds, or to relatively large numbers of seeds;
3. is adaptable to bulk processing;
4. is adaptable to high purity pericarp isolation from the remainder of the seed;
5. is adaptable to pericarp removal for a variety of applications, including but not limited to food processing and extraction of pericarp for analysis or extraction substances;
6. is scalable in volume while retaining time and labor efficiencies;
7. is adaptable to substantial or even total automation.

These and other objects, features, and advantages of the present invention will become more apparent with reference to the accompanying specification and claims.

BRIEF SUMMARY OF THE INVENTION

The present invention relates to an apparatus and method for removing the outer coating or pericarp from seed. The method includes sonicating the seed to loosen the pericarp of the seed. The method can include isolating the pericarp. Optionally, the method includes purifying the removed pericarp to remove any remnant portions of the remainder of the seed.

Another aspect of the invention is utilization of the removed pericarp for a number of applications including but not limited to food processing of either pericarp or other parts of the seed separated from the pericarp, extraction of substances from pericarp, or genetic analysis of the pericarp. A further aspect of the methodology involves utilizing the isolated pericarp for use in plant breeding or a genetic modification experiment.

The apparatus according to the invention includes a holding container for one or more seeds and a sonication mechanism for generating ultrasound energy and imparting ultrasound wave energy upon any seeds in the holding container. The sonication mechanism produces ultrasound wave energy selected to loosen the pericarp. In one embodiment, the holding container is adapted to hold a liquid medium during sonication.

Optionally, the apparatus includes a frictional mill adapted to receive a sonicated seed and frictionally mill it for the purpose of separating the loosened pericarp from the endosperm. This step is adapted to breakdown bonds between pericarp and the seed to facilitate separation of pericarp without detrimentally affecting the DNA in the pericarp. A further option of the apparatus is a component for the purpose of removing remnant endosperm or other parts of the seed from the pericarp. Examples of such a component include a frictional grinder or a mild chemical solution bath. Either one can be used to clean or purify pericarp.

Another optional aspect of the invention includes an apparatus and method for removing a portion of the seed prior to sonication. In the example of corn, the device can be used to remove a tip cap of the seed. The apparatus includes a cutting or grinding mechanism having a cutting or grinding edge. A receiver structure is positioned adjacent the path or the cutting or grinding edge and includes an opening into which a seed can be manually inserted. The opening guides and supports the seed to allow controlled movement of the seed by an operator into the path of the cutting or grinding mechanism to effect removal the portion of the seed, such as tip cap.

DETAILED DESCRIPTION OF THE PREFERRED EMBODIMENT

Figure 1:
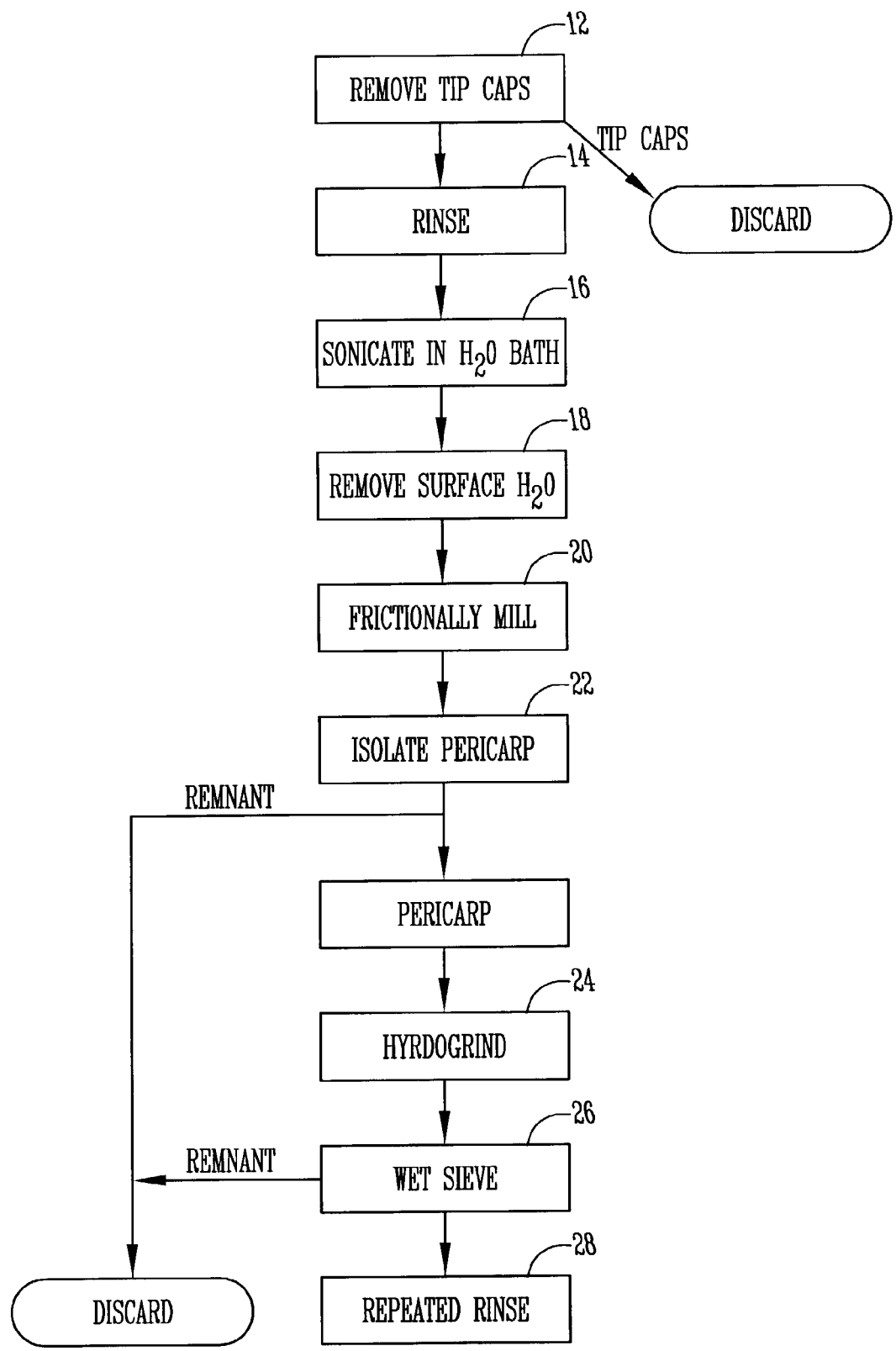
FIG. 1 is a diagram of a methodology according to one embodiment of the present invention.

In order to obtain a better understanding of the invention, a detailed description of one embodiment thereof will now be set forth. It is to be understood that this is but one example of how the invention can be made and practiced, and that other variations, within the scope of the claims, are possible and envisioned.

Reference will be taken from time to time to the appended drawings. Reference numbers will be utilized in the drawings to indicate certain parts and locations in the drawings. The same reference numbers will be used to indicate the same parts or locations throughout the drawings unless otherwise indicated.

A. Environment of the Exemplary Embodiment

The embodiment described herein will be in the context of separating pericarp from corn or maize kernels. Also, the context will be separation of pericarp from a batch of approximately several hundred or less seeds for the purpose of isolating it from other parts of the kernel for genetic analysis of pericarp.

It is to be understood, however, that the invention is applicable in other contexts or in other applications, including other seed types, either with all or some of the steps described regarding the preferred embodiment.

B. Method of the Exemplary Embodiment

Referring to FIG. 1, a flow chart diagram of a method for isolating pericarp of corn kernels according to the invention is set forth.

1. Preparation

An optional preliminary step is removal of the tip caps of the corn kernels: the attachment structure of the kernel to the cob (see step 12, FIG. 1). This step prevents substances at and in the tip caps from complicating and contaminating the pericarp removal process. The tip cap material is not desirable when genetic testing of the pericarp because it contains parental genetics, as opposed to just female material.

The corn kernel tip caps can be removed, seed by seed, by manually cutting them off with a knife or scalpel. The tip caps can either be discarded or retained for some other use or storage. As can be appreciated, manual removal is somewhat time-consuming and tedious.

Figure 2:
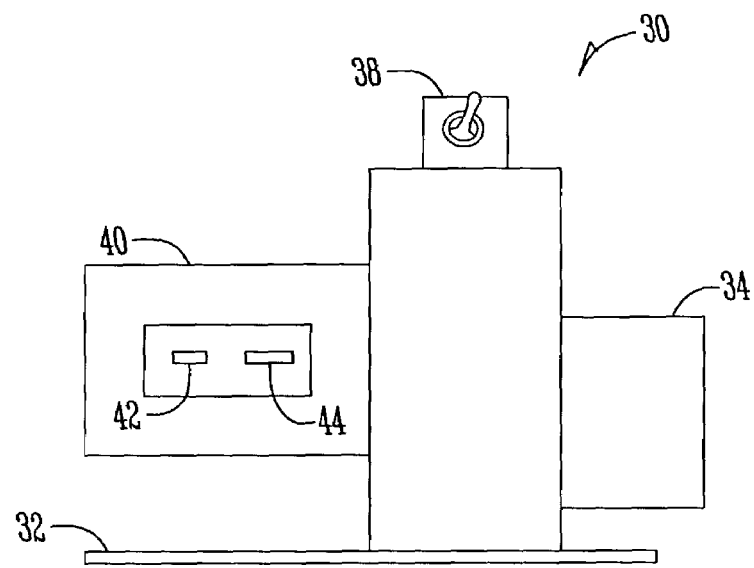
FIG. 2 is an assembled view of a tip cap removing device according to one embodiment of the present invention.
Figure 3:
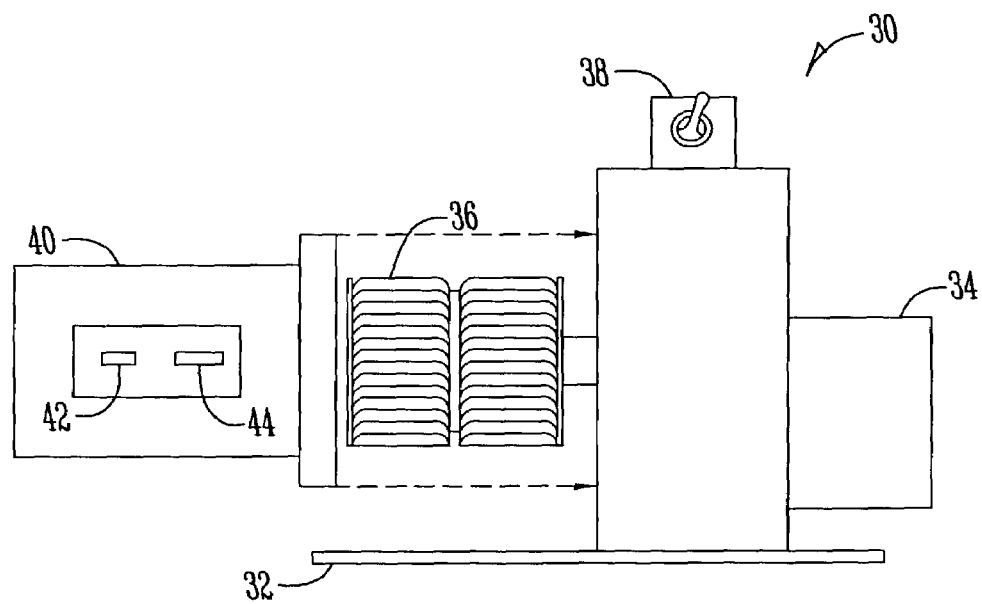
FIG. 3 is a partially disassembled view of the device of FIG. 2.

An alternative way is illustrated in FIGS. 2 and 3. A mechanized device 10 for removing tip caps is disclosed. An electric motor 34 (15 Volts AC; 0.5 Amps; 3100 RPM—similar in size and power to an electric pencil sharpener motor) is supported in housing 32 on a base that can be mounted on a tabletop or other support so that an outward extending axle (not shown) of motor 34 is in a generally horizontal plane.

As can be seen in FIG. 3, a cylindrically shaped member can be mounted on the end of the motor axle and includes a plurality of cutting blades 36 disposed radially and in parallel to the axle. A cover 40 is removeably mounted by tightening screw 46 (FIG. 3) to base/housing 32. Removable cover 40 surrounds the perimeter of cutting blades 36.

Cutting blades 36 have outer edges (preferably sharpened) positioned at the perimeter of what is essentially a cylindrical cage attached along its longitudinal axis to the motor axle. The cage, and thus the blades, rotate with rotation of the motor. The blade edges travel in a circular path.

Removable cover 40 includes at least one slot which is sized and shaped to approximately the size and shape of a corn kernel. The slot has a perimeter shape to approximate the perimeter shape of a corn kernel. In the embodiment of FIGS. 2 and 3, there are two slots, one slightly smaller than the other (e.g. useful for different size or shape seeds). The two slots can be different shapes and sizes, for example, one opening can be ⅛" by ⅜" and the other ¼" by ⅜". In an alternative embodiment the slots may be round holes ⅛" and ¼" in diameter, respectively. The intent is to have an opening into which a corn kernel can be inserted tip cap first, and restrain the kernel (by the side walls defining the opening) against lateral movement of the kernel, and allow an operator to manually control and guide the seed towards and into the path of the cutting blades against the forces created by the blades.

Also, each slot can be tapered or narrowed. This is preferable designed so that a kernel can be pushed only part way down into a slot and then the interior dimensions of the slot prevent further inward movement under normal forces. This would provide essentially an automatic stop such that only approximately the tip cap is subjected to the blade. It is also a safety feature.

An alternative to cutting blades could be a rotating abrasive disc (e.g. sandstone). Other types of mechanized cutters or grinders could be used.

In operation, cutting blades 36 rotate by actuation of motor 34 inside removable cover 40. The cutting edges of blades 36 pass by the slots in cover 40. The user takes a kernel of corn and inserts it tip-cap first into the most appropriately sized cutting slot 42 or 44 (the one that most closely conforms to the size and shape of the kernel). The user then moves the kernel inwardly until the cutting blades 36 cut the tip cap off. The user may have to retract the kernel, check it, and reinsert it to cut completely off the tip cap. In any event, this arrangement allows for relatively quick and easy tip cap removal.

It has been found that utilizing tip cap remover 30, approximately one seed per 1 to 3 seconds can be processed. Thus, tip caps could be removed from a batch of 50 seeds, for example, in just a couple of minutes. Manual cutting with a knife or scalpel is somewhat slower, especially if precise cutting is desired, and is much more dangerous.

A second optional preparation step for the kernels, with tip caps removed, is to rinse them in clean water (step 14, FIG. 1). Rinsing the whole batch with water preferably is done for around two to five minutes. This will also help remove debris or other unwanted possible contaminants.

2. Loosening of Pericarp

The batch of kernels are placed together in a mechanism 50 (FIG. 4) that utilizes sonication for the purpose of loosening pericarp from the endosperm of each kernel. Examples of such a sonication mechanism 50 are (a) a VWR Model 750 ultrasonic cleaner manufactured by and available from VWR Scientific Products of West Chester, Pa., and (b) a Zenith OMEGA-HF80, manufactured by Zenith Ultrasonics of Norwood, N.J. The sonication device 50 includes a removable mesh, water permeable basket or container 52 that is insertable through a top opening into a liquid holding container 54 in device 50; having a mesh size that does not allow passage of seeds.

In this embodiment, the liquid in container 54 is water. Optionally, some other liquid can be used in the sonication device. One example would be a milder base, in particular sodium bicarbonate (NaHCO$_3$). The liquid of the sonication bath preferably is selected so that it does not damage or adversely effect the genetic content of the pericarp.

Seeds to be sonicated are placed into basket 52. Basket 52 is placed into the fluid in fluid container 54 of sonicator 50. A cover is placeable over container 54 and a ultrasonic energy generator 56 (AC powered) is operated to generate ultrasonic waves of an energy level and frequency designed to cause substantial loosening of pericarp from the kernels while they are exposed to the ultrasound energy in the water. The batch of seeds is sonicated (500 W) for 10 minutes at 40 kHz.

By substantial loosening, it is meant that the pericarp becomes pliable enough and the bonds with the endosperm disturbed enough that, with little pressure or forces, it can be moved around on the endosperm. For example, a person could use his/her fingers and slide the pericarp around on the endosperm and/or tear it off.

Figure 4:
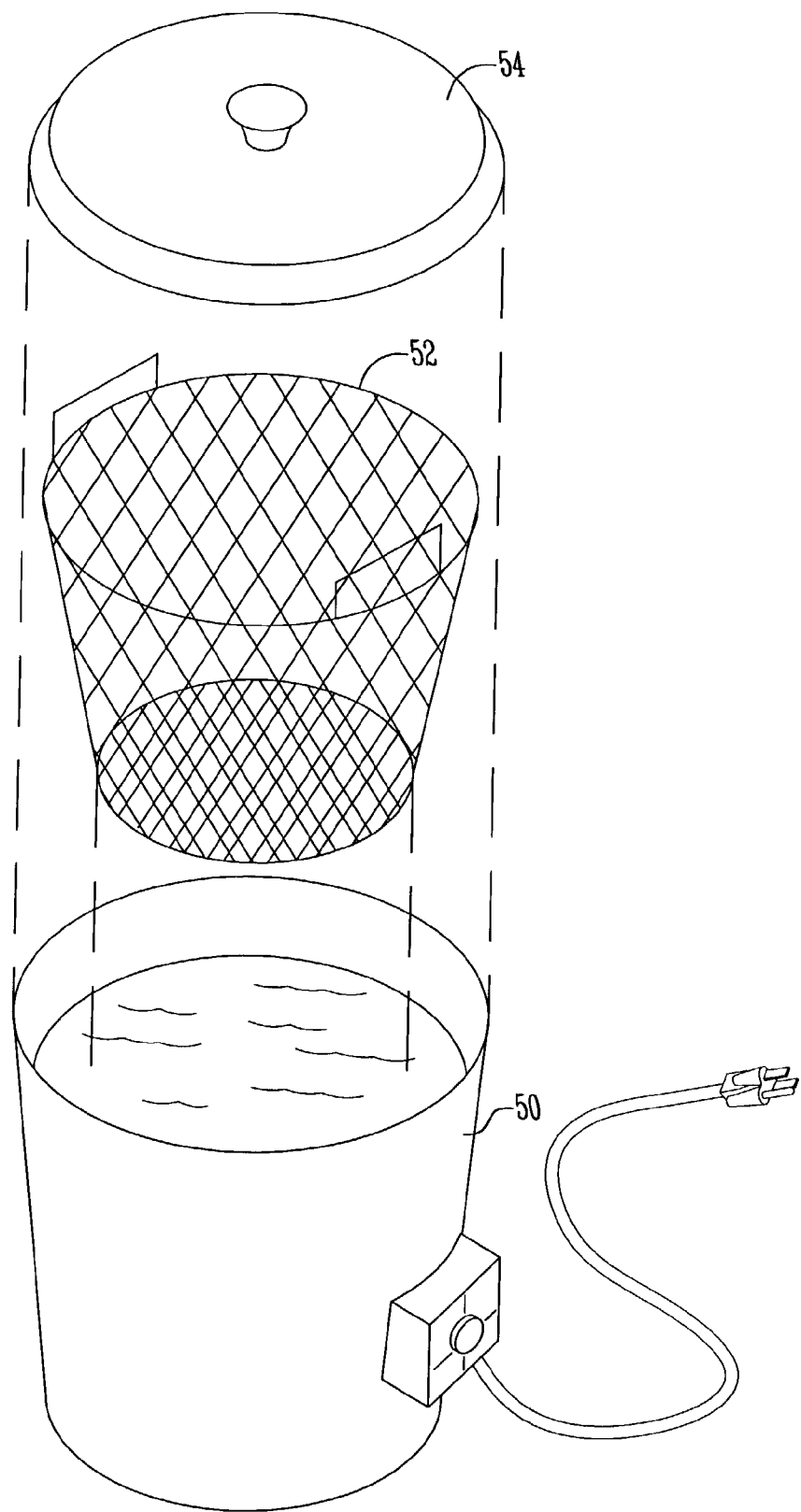
FIG. 4 is simplified perspective depiction of a sonication mechanism and seed holding container according to an embodiment of the invention.

It has been found that ultrasonic wavelengths in the approximate range of 40 kHz to 80 kHz at room temperature (approx. 20 to 25 degrees C.) work satisfactorily towards this end for the above-identified models of device 50. As indicated in FIG. 4, frequency and/or intensity of the ultrasound in somewhat adjustable by control 58. It is believed that a wide variety of ultrasound energy frequencies and/or intensities can be used and effectively substantially loosen pericarp. It is also believed that higher intensities may speed up the loosening.

Sonication time with device 50 was on the order of ten minutes. It has been found that sonication times over approximately 10 minutes do not appear to materially improve separation effectiveness of pericarp from the endospenn with this device 50.

It is believed that the ultrasonic waves bombard and disrupt the bonding between pericarp and endosperm yielding relatively clean, separated pericarp with slight endosperm contamination on some pericarp.

Other sonication devices are possible, including ones that could simultaneously sonicate much larger batches. Optionally, heat could also be applied for assist in the loosening of pericarp.

3. Separation of Pericarp

After the sonication bath of step 16, surface water is removed (step 18, FIG. 1) from the kernels. Methods of doing so for the whole batch are to pour the batch onto an absorbent material and/or blot the sonicated kernels with paper towels. At this point, the pericarp is substantially loosened from the remainder of its seed. However, there is not complete separation between pericarp and kernel for all the kernels.

Separation of pericarp is needed to physically remove the pericarp from the endosperm. One method is to frictionally mill or rub the sonicated kernels (step 20, FIG. 1).

Figure 5:
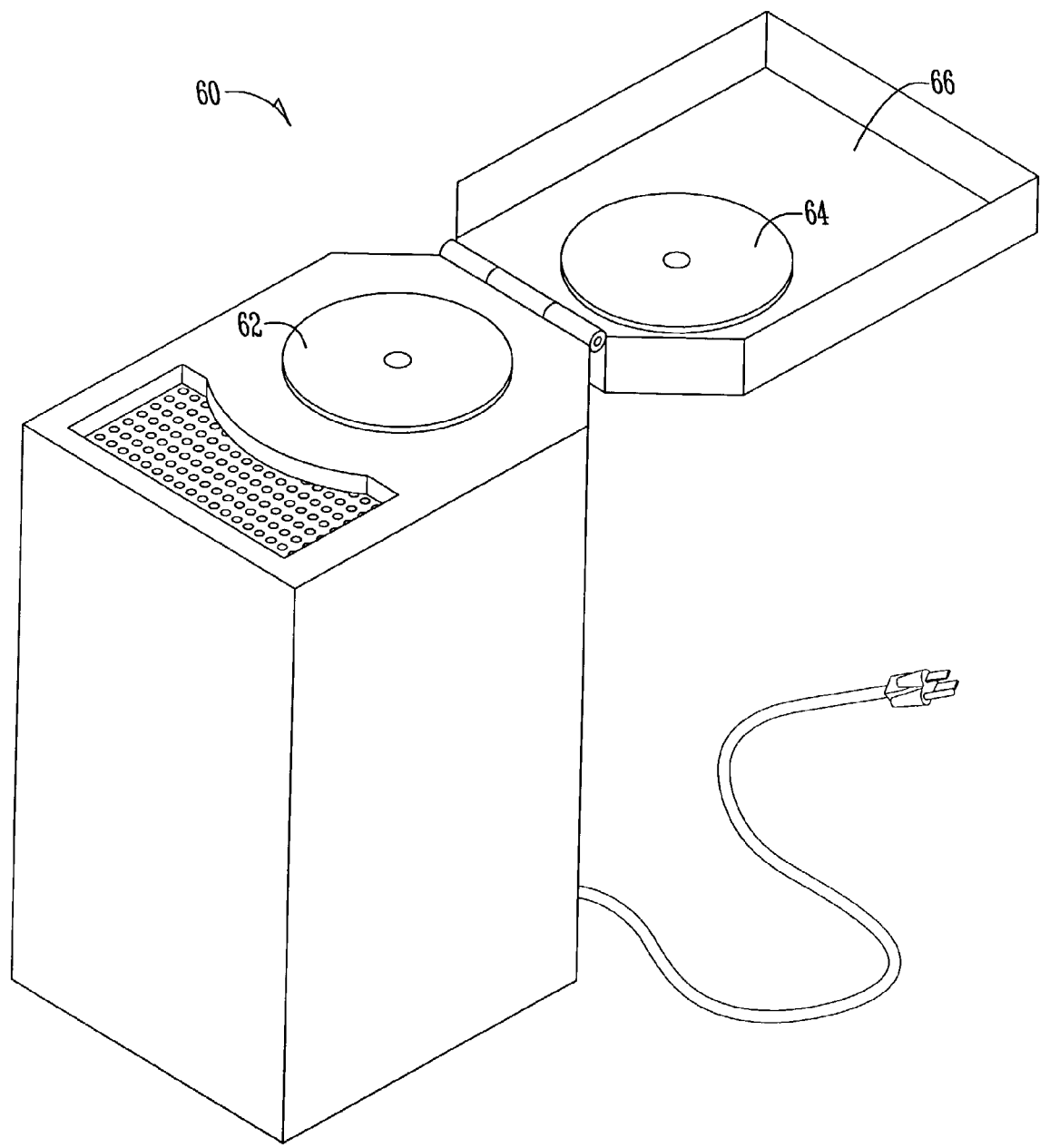
FIG. 5 is a simplified perspective depiction of a frictional mill that can be used with an embodiment of the invention.

One example of such a frictional milling device is a Kett rice or grain polisher (Model Pearlest, power source: 100 VAC (50.60 Hz), manufactured by Kett of Villa Par, Calif.). FIG. 5 illustrates such a frictional mill 60 (AC powered) in simplified form. One limitation of such a mill 60 is that it can effectively handle only a few kernels at a time. However, larger frictional mills having similar operational characteristics are available commercially. It has been found that the Kett rice polisher effectively separated pericarp from the remainder of the seed with this type of action.

Several sonicated kernels are placed on a plastic or rubber disc 62 in mill 60. A complimentary rubber or plastic disc 64 mounted in hinged cover 66 can be brought down adjacent and parallel to the first rubber disc 62, and locked in place (e.g. by a latching mechanism). The gap between discs 62 and 64 is adjustable. Disc 64 can have an abrasive surface. In some embodiments, disc 64 also rotates. Upon actuation, an electric motor rotates disc 62 (e.g. relatively small AC motor, for example, a Dayton permanent magnet DC motor, operating at a torque of 18.9 lb. in., 6.9 Amps DC and 102 VAC). The rotation of disc 62 causes the kernels to rub against disc 64 and each other, creating frictional milling which more completely separates the pericarp from the endosperm. This step preferably is performed for approximately 10 to 20 seconds. It results in the tearing away of the pericarp from the endosperm, but leaves the pericarp substantially intact.

Variations that might be advantageous include changes of the gap between wheel 62 and disc 64 and the size of the motor. Also, some models have a feed inlet that allows the seeds to be fed into the device. The size and nature of the feed inlet might be changed, if desired.

An alternative to the Kett rice or grain polisher type of frictional mill is a McGill #2 rice mill manufactured by Rapsco Industries, Inc. of Brookshire, Tex. Others are possible.

Another alternative, for larger batches of seed, would be a scaled up version, with a more powerful motor (e.g. ½ hp).

It has been found to be preferable to relatively immediately mill the seed with a Kett Polisher after sonification because, for some reason, the pericarp tends to reaffix itself firmly to the endosperm a few hours after sonication.

4. Isolation of Pericarp

At this point, there is a more complete separation of pericarp from the remainder of its seed, but there is a mixture of pericarp and remainder in the frictional mill. It is desirable, in some cases, that the pericarp be isolated from the remainder.

One way to do so with the Kett rice polisher 60 is to simply manually pick out pericarp (e.g. with tweezers or fingers) and place it in a separate place or container. The remnant can be either discarded or utilized as desired.

An alternative might be to operate the frictional mill sufficiently that the remainder of the seed is finely ground up such that the pericarp (which remains largely intact through this point of the process) can be strained out or otherwise mechanically isolated from the endosperm and other remainder.

5. Cleaning of Pericarp

As pointed out earlier, the above steps yield relatively clean pericarp with slight endosperm contamination on some pericarp. If further purification of the pericarp is desired, as can be the case when pericarp is used for genetic analysis, the residual endosperm must be removed. As indicated in FIG. 1, step 24, one way to do so is by wet milling or hydrogrinding. Endosperm contaminants on pericarp are removed by rubbing action against a rough surface while leaving the pericarp intact. The residue endosperm is rubbed or polished off the pericarp, again leaving the pericarp substantially intact.

One example of a hydrogrinding device is a manually operated mortar and pestle (e.g. 500-milliliter capacity) to grind away the endosperm, and, if not previously removed, tip caps that attached to the pericarp. A slight amount of water (e.g. a few milliliters) is introduced into the mixture of pericarp and remainder to facilitate the grinding and rubbing actions. This could be used for the whole batch of kernels, or a portion thereof.

This process is effective to substantially clean the slight endosperm contaminant on separated pericarp. However, the hydrogrinding method cannot guarantee a complete removal of the tip cap from the pericarp, so it is preferable to cut off tip cap before milling. Instead of hydrogrinding, other materials, such as green pad sponges, sandpaper, metal files, metal plates, and metal and plastic brushes can be used to rub or abrade contaminated or dirty pericarp. Mechanized hydrogrinders could be used if they can be adjusted to remove the endosperm residue without damaging or destroying the pericarp.

Other examples for this cleaning step include use of a variety of wet mills.

Other methods are possible to clean or purify the pericarp. For example, instead of manual or mechanized cleaning, a chemical cleaner might be used. One example would be the use of a lactic acid or sodium bicarbonate solution of a strength adapted to break gluten bonds and release starch to clean the pericarp and remove endosperm from it without damaging DNA in the pericarp. Other examples include: NAOH, KOH, urea, $Na_2S_2O_5$, and ammonium sulfate solutions, and Acetone/methanol. A chemical cleaner could be used with any size batch of kernels.

6. Final Processing

Final optional steps would be to place the batch of hydroground or otherwise purified pericarp and remainder in a wet mill (FIG. 1, step 26) to separate any still remaining remainder removed from the pericarp by the hydrogrinding, and then repeatedly rinse the purified and isolated pericarp (FIG. 1, step 28) with, for example, water.

Therefore, as described above, the process loosens pericarp for separation, and can be further used, if desired, to isolate and/or clean the pericarp.

As a result of this process, a much faster and effective separation of pericarp is possible while retaining the DNA integrity of the pericarp. Conversely, such complete pericarp removal can be used to salvage a maximum amount of endosperm.

An important step in this process is the rapid and substantial loosening of pericarp from endosperm. It has been found that sonication can do so effectively. It has further been found that for some reason, once a kernel has been sonicated and the pericarp loosened, the pericarp should be isolated from the endosperm relatively quickly. If one waits several hours or more between sonication and isolation of pericarp, it appears that bonds between pericarp and endosperm begin to reform, and over time essentially rebind. Thus, pericarp isolation after sonication should occur quicker than that, and preferably immediately after sonication.

Thus, the method of FIG. 1 results in a highly purified, isolated pericarp of corn, in a quantity useful for genetic analysis, but in only a fraction of an hour, in comparison to the overnight steeping and several hours of labor with present methods.

C. Options and Alternatives

The above-described methodology and devices are but one example of practicing the invention. Variations obvious to those skilled in the art are also contemplated by the invention. Some examples of alternatives have been set forth in the description above. Other alternatives or observations about the invention are as follows.

Pericarp for DNA evaluation does usually require further purification or cleaning after sonication to remove any residual endosperm or other non-pericarp materials. However, there may be some uses or applications where the loosening of pericarp would be followed by, for example, grinding of all the components of the kernels. One such example would be to retain and mix the starch, protein, oil, or other substance from the endosperm with the pericarp, such as in food processing.

Some applications would utilize only some of the steps of the method of FIG. 1. For example, it may be desirable to substantially loosen a seed coat from one or more seeds, but not isolate it. Simply sonicating, without any other steps, might suffice. Another example would be use of sonication and frictional milling without necessarily any of or all of the other steps in FIG. 1.

Still further, the steps of FIG. 1, or a subset thereof, could be combined with other steps or methods. For example, the sonication step of FIG. 1 could be used in combination with the overnight soaking in water and/or manual removal of the seed coat.

In an attempt to find a way to improve the art, experiments on a variety of methods for pericarp separation were conducted. Experiments involving unsoaked corn kernels resulted in finding the pericarp was so tightly attached to the endosperm that it could not be separated. Next, wet milling experimentations were performed. These experiments included soaking the corn in water or chemical solution and sonication in water bath. Though the results were better than the drying milling process, this process is still inefficient. The best results occurred by frictional milling and hydrogrinding the corn after soaking. Therefore combining the sonication method with the hydrogrinding process is the best way to obtain clean pericarp samples.

As can be understood, the method steps of FIG. 1 are susceptible of substantial automation. Tip cap removing device 30 of FIGS. 1 and 3 is semiautomated tip cap removal.

If can therefore be seen that in the above-identified embodiments of the invention, faster more effective method for loosening pericarp for a variety of applications has been described.

What is claimed is:

1. A method for removing pericarp from substantially all of the remainder of a seed comprising:
   (a) sonicating the seed to effectively substantially loosen the pericarp relative to the remainder of the seed;
   (b) removing the pericarp;
   (c) isolating the pericarp from the remainder of the seed after removing the pericarp; and (d) removing any remnant endosperm or contamination from the removed pericarp; so that substantially pure pericarp is derived from the seed.

2. The method of claim 1 further comprising removing a portion of the seed prior to sonication.

3. The method of claim 1 wherein the seed is a maize kernel.

4. The method of claim 3 further comprising removing the tip cap of the kernel before sonication.

5. The method of claim 4 wherein the step of removing the tip cap comprises cutting the tip cap from the kernel.

6. The method of claim 4 wherein the step of removing the tip cap comprises grinding away the tip cap from the kernel.

7. The method of claim 1 further comprising rinsing the seed prior to sonication.

8. The method of claim 7 wherein the rinsing is for three to five minutes.

9. The method of claim 1 wherein the step of removing the pericarp comprises milling the sonicated kernel.

10. The method of claim 9 wherein the milling comprises tearing the pericarp from underlying endosperm.

11. The method of claim 9 wherein the step of removing the pericarp is completed within less than a day from sonication.

12. The method of claim 11 wherein the step of removing the pericarp is accomplished within an hour or less from sonication.

13. The method of claim 9 wherein milling is for ten to twenty minutes.

14. The method of claim 1 wherein the removal of remnant or contamination comprises frictional separation.

15. The method of claim 14 wherein the frictional separation comprises hydrogrinding.

16. The method of claim 15 wherein the hydrogrinding is accomplished by a pestle and mortar.

17. The method of claim 1 wherein removal of remnant or contamination comprises placing the isolated pericarp in a chemical solution adapted to break gluten bonds and release starch.

18. The method of claim 17 wherein the solution comprises lactic acid solution.

19. The method of claim 18 further comprising sieving the isolated pericarp.

20. The method of claim 19 wherein the sieving comprises wet sieving.

21. The method of claim 1 further comprising rinsing the removed pericarp.

22. The method of claim 1 wherein the step of sonication comprises sonication in a liquid bath.

23. The method of claim 22 wherein the sonication is adapted to disrupt the bond between pericarp and endosperm at least temporarily.

24. The method of claim 23 wherein the sonication is adapted to maintain the pericarp pliable and substantially intact and the endosperm hard and subject to crumbling.

25. The method of claim 22 wherein the step of sonicating is adapted to adequately loosen pericarp from endosperm.

26. The method of claim 22 wherein the liquid bath comprises water.

27. The method of claim 22 wherein the liquid bath comprises a mild base.

28. The method of claim 27 wherein the mild base comprises sodium bicarbonate.

29. The method of claim 21 wherein sonication in the liquid bath is performed so that there is not complete imbibition of the kernel.

30. The method of claim 22 wherein the sonication in a liquid bath is for approximately ten minutes or less.

31. The method of claim 22 wherein the sonication is at approximately 20 kHz to 40 kHz.

32. The method of claim 1 further comprising grinding the pericarp and remainder of kernel after removing the pericarp.

33. The method of claim 1 further comprising using the removed pericarp in a plant breeding program.

34. The method of claim 1 further comprising using the removed pericarp for genetic analysis.

35. The method of claim 1 further comprising using the pericarp for extracting substances including nutraceuticals or dietary fiber.

36. The method of claim 1 further comprising using the remainder of the kernel with pericarp removed in a food processing application.

37. An apparatus for separating pericarp from a seed comprising:
a means for sonicating the seeds to effectively substantially loosen the pericarp relative to the remainder of the seed;
a means for removing pericarp from the seed;
a means for isolating the pericarp from the remainder of the seed after removing the pericarp;
a means for removing any remnant endosperm or contamination from the removed pericarp;
so that substantially pure pericarp is derived from the seed.

38. The apparatus of claim 37 further comprising a means for removing a tip cap of a corn kernel.

39. The apparatus of claim 38 wherein the means for removing the tip cap comprises a means for cutting or grinding, a seed receiver positionable next to the means for cutting or grinding, the seed receiver sized to approximately the perimeter size and shape of a seed.

40. The apparatus of claim 37 wherein the means for removing pericarp comprises a frictional mill.

41. The apparatus of claim 37 further comprising a means for purifying removed pericarp.

42. The apparatus of claim 41 wherein the means for purifying the removed pericarp comprises a hydrogrinder device.

43. The apparatus of claim 41 wherein the means for purifying comprises a chemical bath.

44. The apparatus of claim 37 wherein the means for sonicating comprises a fluid permeable seed container, a fluid container into which is placeable the fluid permeable container, and an ultrasound generation component.

45. The apparatus of claim 44 wherein the fluid is water.

46. The apparatus of claim 44 wherein the fluid is sodium bicarbonate.

47. A method for isolating pericarp from the remainder of the corn kernel comprising:
removing the tip cap of the corn kernel;
sonicating the kernel;
frictionally separating pericarp from the remainder of the kernel;
isolating the pericarp; and
cleaning the isolated pericarp.

48. The method of claim 47 wherein the sonication is conducted simultaneously on a plurality of kernels.

49. The method of claim 47 wherein a plurality of tip caps are removed from a plurality of kernels prior to sonication.

50. The method of claim 47 wherein the step of sonicating of the plurality of kernels is in a batch mode.

51. The method of claim 47 further comprising frictionally separating the pericarp simultaneously for a plurality of kernels.

52. The method of claim 47 wherein the step of purifying pericarp comprises hydrogrinding the pericarp.

53. The method of claim 47 wherein the step of purifying the pericarp comprises placing the pericarp in a chemical bath.

* * * * *